(12) United States Patent
Jang (10) Patent No.: US 11,524,671 B2
(45) Date of Patent: Dec. 13, 2022

(54) METHOD AND DEVICE FOR CONTROLLING START OF MILD HYBRID VEHICLE

(71) Applicants: Hyundai Motor Company, Seoul (KR); Kia Motors Corporation, Seoul (KR)

(72) Inventor: Hwa Yong Jang, Hwaeong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 194 days.

(21) Appl. No.: 16/988,933

(22) Filed: Aug. 10, 2020

(65) Prior Publication Data

US 2021/0171008 A1    Jun. 10, 2021

(30) Foreign Application Priority Data

Dec. 9, 2019   (KR) .......................... 10-2019-0162987

(51) Int. Cl.
*B60K 6/00* (2006.01)
*B60W 20/00* (2016.01)
(Continued)

(52) U.S. Cl.
CPC ............ *B60W 20/00* (2013.01); *B60W 10/06* (2013.01); *B60W 10/08* (2013.01); *F02N 11/04* (2013.01); *F02N 11/08* (2013.01); *B60K 2006/268* (2013.01); *B60W 2510/0638* (2013.01); *B60W 2510/1005* (2013.01);
(Continued)

(58) Field of Classification Search
CPC ...... B60W 10/06; B60W 10/08; B60W 10/02; B60W 20/00; B60K 2006/268; F02N 11/04; F02N 11/08
See application file for complete search history.

(56) References Cited

U.S. PATENT DOCUMENTS 6,396,165 B1 * 5/2002 Nagano ................. F02N 11/006
                                                     903/910
6,524,217 B1 * 2/2003 Murakami ............. B60K 6/365
                                                     903/910

(Continued)

FOREIGN PATENT DOCUMENTS

JP                5050325 B2    10/2012

*Primary Examiner* — Gonzalo Laguarda
(74) *Attorney, Agent, or Firm* — Morgan, Lewis & Bockius LLP (57) ABSTRACT

A method for controlling a start of a mild hybrid vehicle that includes an engine, a starter-generator starting the engine or generating electricity by an output of the engine, a starter starting the engine, and a battery supplying electric power to the starter-generator may include: determining, by a controller configured for controlling an operation of the vehicle, whether a start of the vehicle is requested; checking, by the controller, current limit data of the battery when the start of the vehicle is requested; checking, by the controller, start torque current data of the starter-generator according to state data of the vehicle; comparing, by the controller, the current limit data with the start torque current data; and starting, by the controller, the engine using the starter-generator or the starter according to a result of the comparing, by the controller, the current limit data with the start torque current data.

16 Claims, 6 Drawing Sheets

(51) Int. Cl.
  *B60W 10/08* (2006.01)
  *F02N 11/04* (2006.01)
  *F02N 11/08* (2006.01)
  *B60W 10/06* (2006.01)
  *B60K 6/26* (2007.10)
(52) U.S. Cl.
  CPC ... *B60W 2510/244* (2013.01); *B60W 2540/10* (2013.01); *B60W 2540/12* (2013.01); *B60W 2555/20* (2020.02); *F02N 2200/022* (2013.01); *F02N 2200/061* (2013.01); *F02N 2200/0802* (2013.01); *F02N 2200/101* (2013.01); *F02N 2200/102* (2013.01); *F02N 2200/122* (2013.01)

(56) References Cited

U.S. PATENT DOCUMENTS

| | | | | |
|---|---|---|---|---|
| 6,655,485 | B1 * | 12/2003 | Ito | B60K 6/387 |
| | | | | 903/910 |
| 8,612,080 | B2 * | 12/2013 | Steuernagel | B60W 10/119 |
| | | | | 180/65.265 |
| 9,937,919 | B2 * | 4/2018 | Zhang | B60K 6/48 |
| 2009/0183557 | A1 * | 7/2009 | Ono | F02D 41/0097 |
| | | | | 73/114.25 |
| 2014/0379184 | A1 * | 12/2014 | Kim | F02N 15/022 |
| | | | | 180/65.265 |
| 2019/0242316 | A1 * | 8/2019 | Dudar | F02D 41/0007 |

* cited by examiner

METHOD AND DEVICE FOR CONTROLLING START OF MILD HYBRID VEHICLE

CROSS-REFERENCE TO RELATED APPLICATION

The present application claims priority to Korean Patent Application No. 10-2019-0162987 filed on Dec. 9, 2019, the entire contents of which is incorporated herein for all purposes by this reference.

BACKGROUND OF THE INVENTION

Field of the Invention

The present invention relates to a mild hybrid vehicle (or a mild hybrid electric vehicle), and more particularly, to a method and a device configured for controlling a start of a mild hybrid vehicle capable of starting an engine by selecting a starter-generator and a starter when the vehicle starts.

Description of Related Art

A hybrid vehicle includes an engine and a drive motor, and utilizes a power generated by a combustion action of the engine and a power generated by a rotation of the drive motor that utilizes electrical energy stored in a battery.

The hybrid vehicle may be classified into a parallel type, a serial type, and a complex type according to a driving method of the vehicle, and may be classified into a mild type and a hard type according to a power sharing ratio of the engine and the drive motor.

The hard type hybrid vehicle includes a starter-generator that starts an engine or generates power by an output of the engine, and a drive motor that drives the vehicle.

The mild type hybrid vehicle or the mild hybrid vehicle utilizes a low capacity battery and a low-capacity drive motor, unlike the hard type hybrid vehicle. The mild hybrid vehicle includes a mild hybrid starter and generator (MHSG) instead of an alternator.

The mild hybrid vehicle may use the MHSG to assist torque of the engine according to a driving state of the vehicle, and may charge a high voltage battery through regenerative braking to improve fuel efficiency.

The mild hybrid vehicle includes a starter and the MHSG that start the engine. In general, the mild hybrid vehicle starts the engine using the MHSG in a case of a cold start of the vehicle or when the engine is restarted after the engine is off while driving of the vehicle.

This mild hybrid vehicle utilizes the high voltage battery with a small capacity or an optimized capacity to reduce cost.

Thus, an electric current value of the high voltage battery exceeds a limit value and a temperature of the high voltage battery rises when the mild hybrid vehicle is started so that performance and durability of the high voltage battery are deteriorated.

Furthermore, there is a problem that start performance of the vehicle deteriorates due to current limitation of the high voltage battery.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and a device configured for controlling a start of a mild hybrid vehicle configured for starting an engine using a starter-generator and a starter when the vehicle starts according to a current limit value of a battery.

Furthermore, various aspects of the present invention are directed to providing the method and the device configured for controlling a start of the mild hybrid vehicle configured for starting the engine by selecting the starter-generator and the starter based on the current limit value of the battery.

Various exemplary embodiments of the present invention may provide the method for controlling a start of the mild hybrid vehicle, including: determining, by a controller configured for controlling an operation of the vehicle, whether a start of the vehicle is requested; checking, by the controller, current limit data of the battery when the start of the vehicle is requested; checking, by the controller, start torque current data of the starter-generator according to state data of the vehicle; comparing, by the controller, the current limit data with the start torque current data; and starting, by the controller, the engine using the starter-generator or the starter according to a result of the comparing, by the controller, the current limit data with the start torque current data.

Determining whether the start of the vehicle is requested may include: determining, by the controller, that the start of the vehicle is requested when a start request signal is received, a position value of a brake pedal of the vehicle is less than or equal to a first reference value, a position value of an accelerator pedal of the vehicle is greater than or equal to a second reference value, or a shifting stage of a shift lever of the vehicle is changed.

Checking the current limit data of the battery may include: checking, by the controller, the current limit data according to a degradation state of the battery.

Checking the current limit data of the battery may include: checking, by the controller, a degradation state of the battery based on at least one of a state of charge (SOC), a temperature, and a state of health (SOH) of the battery, and a current value of each cell included in the battery; checking, by the controller, a current table matching the current limit data to each of a plurality of degradation states of the battery; and checking, by the controller, the current limit data corresponding to the checked degradation state of the battery in the current table.

Checking the start torque current data of the starter-generator may include: checking, by the controller, the start torque current data of the starter-generator according to at least one of a temperature of a coolant of the engine, an outside air temperature of the vehicle, and revolutions per minute of the engine included in the state data of the vehicle.

Comparing the current limit data with the start torque current data may include: checking, by the controller, a maximum current value of the start torque current data of the starter-generator; and determining, by the controller, whether the current limit data are less than or equal to the maximum current value of the start torque current data.

Starting the engine using the starter-generator or the starter may include: starting, by the controller, the engine using the starter-generator until a reference time when the start torque current data becomes a reference current value when the current limit data are equal to or less than the maximum current value of the start torque current data; and starting, by the controller, the engine using the starter from the reference time to a start completion time.

Starting the engine using the starter-generator or the starter may include: starting, by the controller, the engine using the starter-generator when the current limit data exceed the maximum current value of the start torque current data.

Various exemplary embodiments of the present invention may provide the device configured for controlling a start of the mild hybrid vehicle, including: an engine configured to provide a driving force to the vehicle; a starter-generator configured to start the engine or generate electricity by an output of the engine; a first battery connected to the starter-generator and configured to supply electric power to the starter-generator or to be charged by electric power collected through the starter-generator; a starter engaged to the engine and configured to start the engine; a second battery connected to the starter and configured to supply electric power to the starter; a vehicle state detector configured to detect state data of the vehicle to control the start of the vehicle; a battery manager configured to check state data of the first battery and generate current limit data according to the state data of the first battery; and a controller connected to the battery manager and the vehicle state detector and configured to receive the current limit data of the first battery from the battery manager when the start of the vehicle is requested, check start torque current data of the starter-generator according to state data of the vehicle, and start the engine using the starter-generator or the starter based on the current limit data and the start torque current data.

The battery manager may be configured to check the state data of the first battery including at least one of a state of charge (SOC), a temperature, and a state of health (SOH) of the first battery, and a current value of each cell included in the first battery.

The battery manager may be configured to check a degradation state of the first battery based on the state data of the first battery and to check the current limit data according to the degradation state of the first battery.

The controller may be configured to determine that the start of the vehicle is requested when a start request signal is received, a position value of a brake pedal of the vehicle is less than or equal to a first reference value, a position value of an accelerator pedal of the vehicle is greater than or equal to a second reference value, or a shifting stage of a shift lever of the vehicle is changed.

The controller may be configured to check the start torque current data of the starter-generator according to at least one of a temperature of a coolant of the engine, an outside air temperature of the vehicle, and revolutions per minute of the engine included in the state data of the vehicle.

The controller may be configured to check a maximum current value of the start torque current data of the starter-generator and start the engine using the starter-generator when the current limit data exceed the maximum current value of the start torque current data.

The controller may be configured to check a maximum current value of the start torque current data of the starter-generator, start the engine using the starter-generator until a reference time when the start torque current data becomes a reference current value when the current limit data are equal to or less than the maximum current value of the start torque current data, and start the engine using the starter from the reference time to a start completion time.

The controller may be configured to set the reference current value which is less than the current limit data.

The vehicle state detector may include: a start detector configured to detect the start of the vehicle; a brake pedal position detector configured to detect a position value of a brake pedal of the vehicle; an accelerator pedal position detector configured to detect a position value of an accelerator pedal of the vehicle; a shifting stage detector configured to detect a shifting stage of a shift lever of the vehicle; a coolant temperature detector configured to detect a temperature of a coolant of the engine; an outside air temperature detector configured to detect an outside air temperature of the vehicle; and a revolutions per minute (RPM) detector configured to detect revolutions per minute (RPM) of the engine.

The method and the device configured for controlling a start of the mild hybrid vehicle according to the exemplary embodiment of the present invention may start the engine using the starter-generator and the starter when the vehicle starts according to the current limit value of the battery so that startability of the vehicle is ensured.

Furthermore, the exemplary embodiment of the present invention may start the engine through the starter-generator and the starter so that performance and durability of the battery is improved.

In addition to the aforementioned advantageous effect, an effect which may be obtained or anticipated by applying various exemplary embodiments of the present invention will be included explicitly or implicitly in the detailed description of the exemplary embodiment of the present invention. In other words, various effects expected by applying various exemplary embodiments of the present invention will be included within the detailed description to be provided later.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, an operation principle of a device and a method for controlling a start of a mild hybrid vehicle of the present invention will be described in detail with reference to the description and the accompanying drawings. However, the drawings and the detailed description relate to an exemplary embodiment among several exemplary embodiments for effectively describing features of the present invention. Therefore, the present invention is not limited only to the drawings and description.

Furthermore, in describing below exemplary embodiments of the present invention, the related well-known functions or constructions will be omitted in detail since they may unnecessarily obscure the understanding of the present invention. Furthermore, the following terminologies are defined in consideration of the functions in various exemplary embodiments of the present invention and may be construed in different ways by the intention of users and operators, practice, or the like. Therefore, the definitions thereof may be construed based on the contents throughout the specification.

Furthermore, to effectively describe core technical features of the present invention, terms may be appropriately changed, integrated, or separated for those skilled in the art in a technical field to which various exemplary embodiments of the present invention belongs to explicitly understand the present invention, but the present invention is not limited thereto.

Hereinafter, an exemplary various exemplary embodiments of the present invention will be described in detail with reference to the accompanying drawings.

Figure 1:
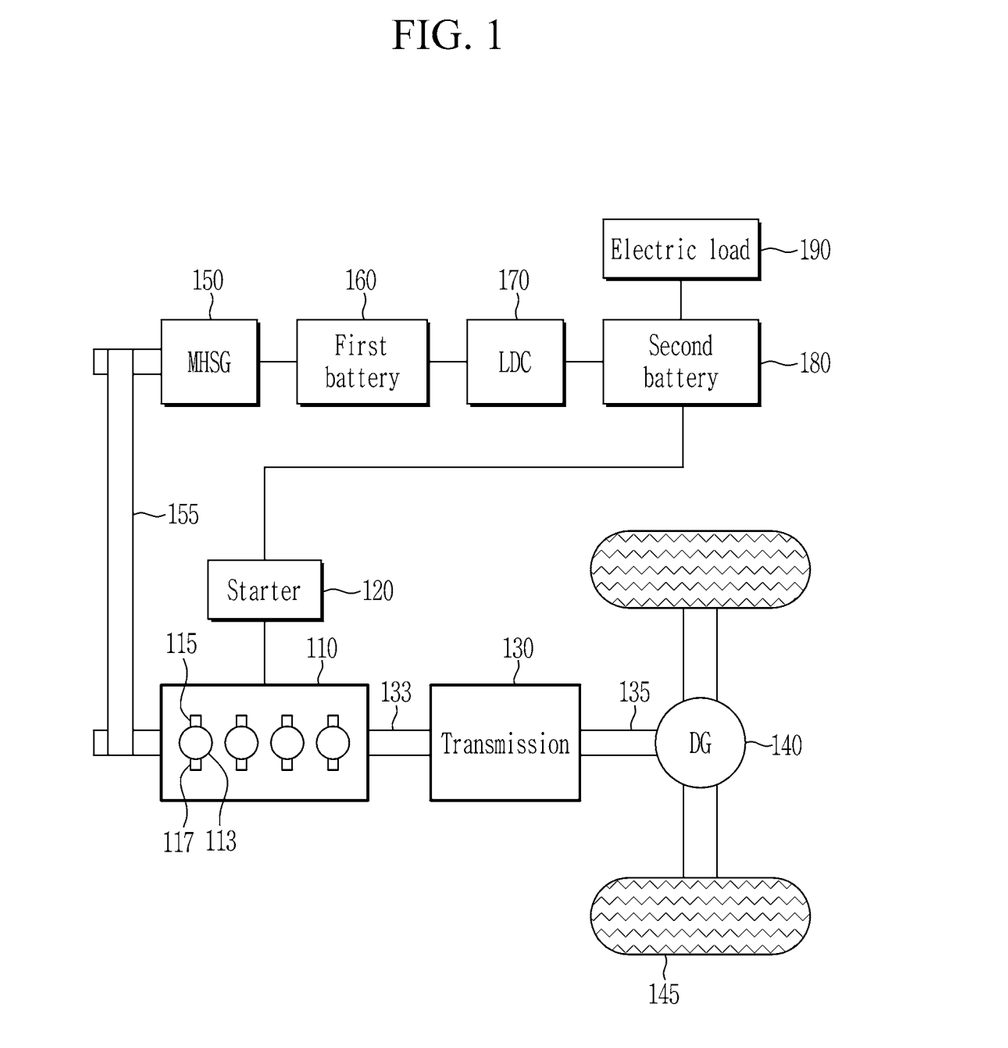
FIG. 1 is a schematic diagram showing a mild hybrid vehicle to which a method for controlling a start of the mild hybrid vehicle according to various exemplary embodiments of the present invention is applied.

FIG. 1 is a schematic diagram showing a mild hybrid vehicle to which a method for controlling a start of the mild hybrid vehicle according to various exemplary embodiments of the present invention is applied.

Referring to FIG. 1, the mild hybrid vehicle may include an engine 110, a starter 120, a transmission 130, a differential gear device 140, a driving wheel 145, a starter-generator or a mild hybrid starter and generator (MHSG) 150, a first battery 160, a low voltage DC-DC Converter (LDC) 170, a second battery 180, and an electric load 190.

The engine 110 may combust fuel to generate torque. The engine 110 may convert chemical energy into mechanical energy by combusting fuel and air.

The engine 110 may include combustion chambers 113, ignition devices 115, and injectors 117.

Fuel and air may flow in the combustion chamber 113, the ignition device 115 may ignite the fuel and the air flowed in the combustion chamber 113, and the injector 117 may inject fuel into the combustion chamber 113.

For example, the engine 110 may be a gasoline engine, a diesel engine, or a liquefied petroleum injection (LPI) engine.

In a power delivery of the mild hybrid vehicle, torque of the engine 110 may be transmitted to an input shaft 133 of the transmission 130, and a torque output from an output shaft 135 of the transmission 130 may be transmitted to an axle via the differential gear device 140. When the axle rotates the driving wheel 145, the mild hybrid vehicle may be driven by torque of the engine 110.

The starter 120 may start the engine 110. The starter 120 may receive electric power from the second battery 180.

The transmission 130 may convert an output torque of the engine 110 to a target torque. The transmission 130 may select a shifting stage or a transmission stage according to the vehicle speed and a position value of an accelerator pedal of the vehicle to convert a received torque to the target torque, and may output the converted target torque to the driving wheel 145 to drive the vehicle.

The transmission 130 may be an automatic transmission or a manual transmission.

The MHSG 150 may convert electrical energy to mechanical energy or mechanical energy to electrical energy. In other words, the MHSG 150 may start the engine 110 or generate electricity by an output of the engine.

Furthermore, the MHSG 150 may assist the torque of the engine 110. The mild hybrid vehicle may use the torque of the MHSG 150 as an auxiliary power while combustion torque of the engine 110 is a main power.

The first battery 160 may supply electric power to the MHSG 150 or may be charged by electric power collected through the MHSG.

The first battery 160 may be a high voltage battery and may be referred to as a main battery.

For example, the first battery 160 may be a lithium-ion battery. The lithium-ion battery may have fast charging and discharging speed and good durability, but may have poor energy storage performance and poor charging and discharging efficiency at an extremely low temperature.

The LDC 170 may convert a voltage (e.g., 48 V) supplied from the first battery 160 to a low voltage (e.g., 12 V) to charge the second battery 180.

The second battery 180 may be charged through electric power supplied from the LDC 170. The second battery 180 may be a low voltage battery and may be called an auxiliary battery.

The second battery 180 may supply electric power to the electric load 190 using low voltage.

Furthermore, the second battery 180 may supply electric power to the starter 120.

For example, the second battery 180 may be an absorptive glass mat (AGM) battery or a lead-acid battery.

The electric load 190 may represent a part driven by the second battery 180. For example, the electric load 190 may include a headlight, a fog light, a wiper, an air conditioner, and a sunroof.

Figure 2:
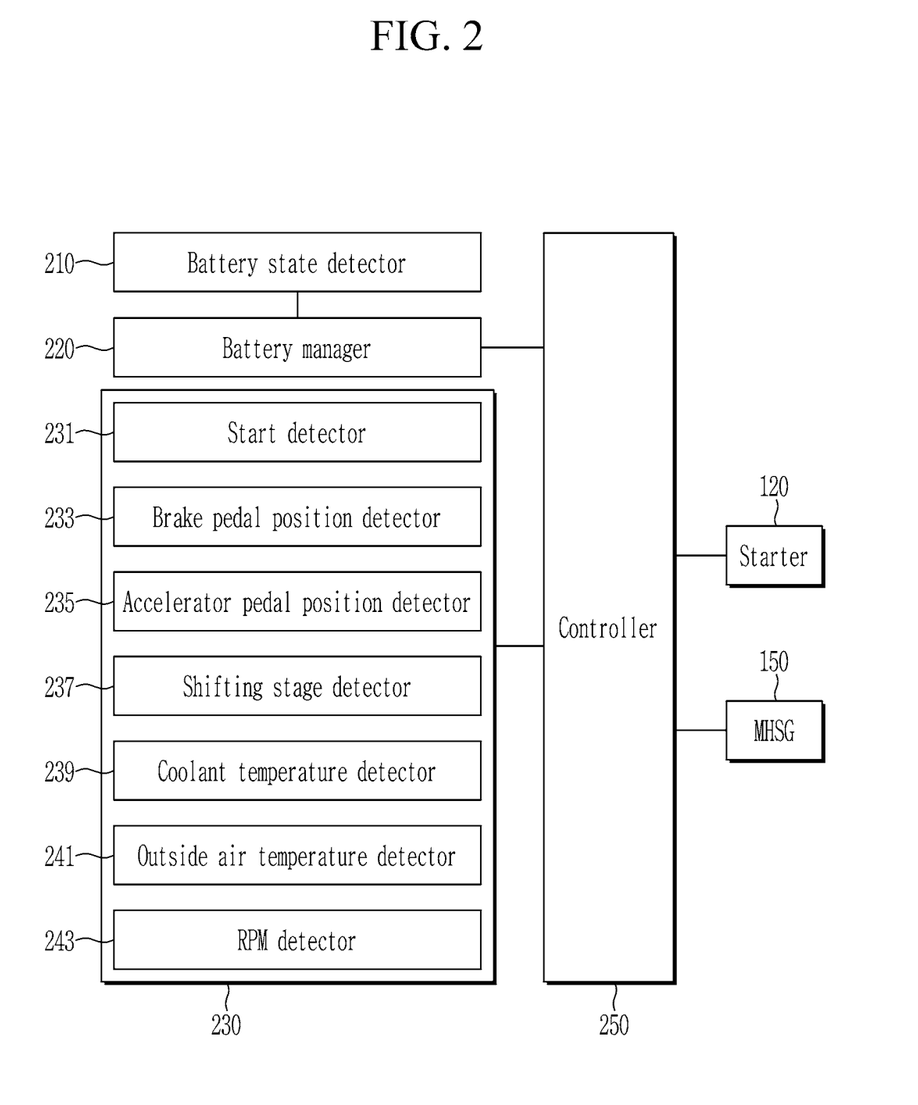
FIG. 2 is a block diagram showing a device configured for controlling a start of the mild hybrid vehicle according to various exemplary embodiments of the present invention.

FIG. 2 is a block diagram showing a device configured for controlling a start of the mild hybrid vehicle according to various exemplary embodiments of the present invention.

Referring to FIG. 2, the device configured for controlling a start of the mild hybrid vehicle may include a battery state detector 210, a battery manager 220, a vehicle state detector 230, a controller 250, the starter 120, and the MHSG 150.

The battery state detector 210 may detect state data of the first battery 160 and state data of the second battery 180. In more detail, the battery state detector 210 may detect at least one of a state of charge (SOC), a temperature, and a state of health (SOH) of the first battery 160 and at least one of a state of charge (SOC), a temperature, and a state of health (SOH) of the second battery 180, and may detect an electric current value (or a current value) or a voltage value of each cell included in the first battery and the second battery.

The battery manager 220 may control the first battery 160 and the second battery 180.

The battery manager 220 may receive the state data of the first battery 160 from the battery state detector 210. The battery manager 220 may generate current limit data or a current limit value of the first battery 160 based on the state data of the first battery 160. The battery manager 220 may provide the current limit data to the controller 250.

The vehicle state detector 230 may detect state data of the vehicle to control start of the mild hybrid vehicle. The vehicle state detector 230 may include a start detector 231, a brake pedal position detector 233, an accelerator pedal position detector 235, a shifting stage detector 237, a coolant temperature detector 239, an outside air temperature detector or an ambient air temperature detector 241, and a revolutions per minute (RPM) detector 243.

The start detector 231 may detect a start request signal when a driver of the vehicle requests start of the vehicle using a start key, a start button, or a smart key (SMK), and may provide the detected start request signal to the controller 250.

The brake pedal position detector 233 may detect a degree to which the driver presses a brake pedal of the vehicle. The brake pedal position detector 233 may detect a position value of the brake pedal (i.e., a degree to which the brake pedal is pressed) to provide a signal corresponding to the detected value to the controller 250.

A position value of the brake pedal may be 100% when the brake pedal is fully pressed, and the position value of the brake pedal may be 0% when the brake pedal is not pressed.

In another exemplary embodiment of the present invention, the brake pedal position detector 233 may detect an on state or an off state of the brake pedal instead of the position value of the brake pedal.

The accelerator pedal position detector 235 may detect a degree to which the driver presses an accelerator pedal of the vehicle. The accelerator pedal position detector 235 may detect a position value of the accelerator pedal (i.e., a degree to which the accelerator pedal is pressed) to provide a signal corresponding to the detected value to the controller 250.

A position value of the accelerator pedal may be 100% when the accelerator pedal is fully pressed, and the position value of the accelerator pedal may be 0% when the accelerator pedal is not pressed.

In another exemplary embodiment of the present invention, a throttle valve opening detector mounted on an intake passage of the vehicle may be used instead of the accelerator pedal position detector 235. The accelerator pedal position detector 235 may include the throttle valve opening detector.

The shifting stage detector 237 may detect a shifting stage of a shift lever of the vehicle or a shifting stage of the transmission 130. The shifting stage detector 237 may detect the shifting stage of the shift lever operated by the driver. The shifting stage detector 237 may provide the detected shifting stage to the controller 250.

The coolant temperature detector 239 may detect a temperature of a coolant of the engine 110 to provide the detected temperature to the controller 250.

The outside air temperature detector 241 may detect an outside air temperature of the mild hybrid vehicle to provide the detected temperature to the controller 250.

The revolutions per minute (RPM) detector 243 may detect revolutions per minute (RPM) of the engine 110. The revolutions per minute (RPM) detector 243 may provide the detected RPM of the engine 110 to the controller 250.

The controller 250 may control an overall operation of the mild hybrid vehicle. The controller 250 may control the battery state detector 210, the battery manager 220, the vehicle state detector 230, the starter 120, and the MHSG 150.

The controller 250 may determine whether a start of the vehicle is requested based on the state data provided from the vehicle state detector 230.

The controller 250 may receive current limit data of the first battery 160 from the battery manager 220 when the start of the vehicle is requested.

The controller 250 may check start torque current data or a start torque current value of the MHSG 150 according to the vehicle state data. The start torque current data may indicate an electric current required in the MHSG 150 when start of the vehicle is requested.

The controller 250 may compare the current limit data with the start torque current data, and may start the engine 110 through the MHSG 150 or the starter 120 according to a result of the comparing, by the controller, the current limit data with the start torque current data.

In more detail, the controller 250 may start the engine 110 using the MHSG 150 when the current limit data exceed the start torque current data. The controller 250 may start the engine 110 using the MHSG 150 and the starter 120 when the current limit data are less than or equal to the start torque current data.

The controller 250 may be implemented as at least one microprocessor operated by a program. The program may include a series of commands for executing the method for controlling a start of the mild hybrid vehicle according to the exemplary embodiment of the present invention described below.

The method for controlling a start of the mild hybrid vehicle will be described in more detail referring to FIG. 3 and FIG. 4.

Figure 3:
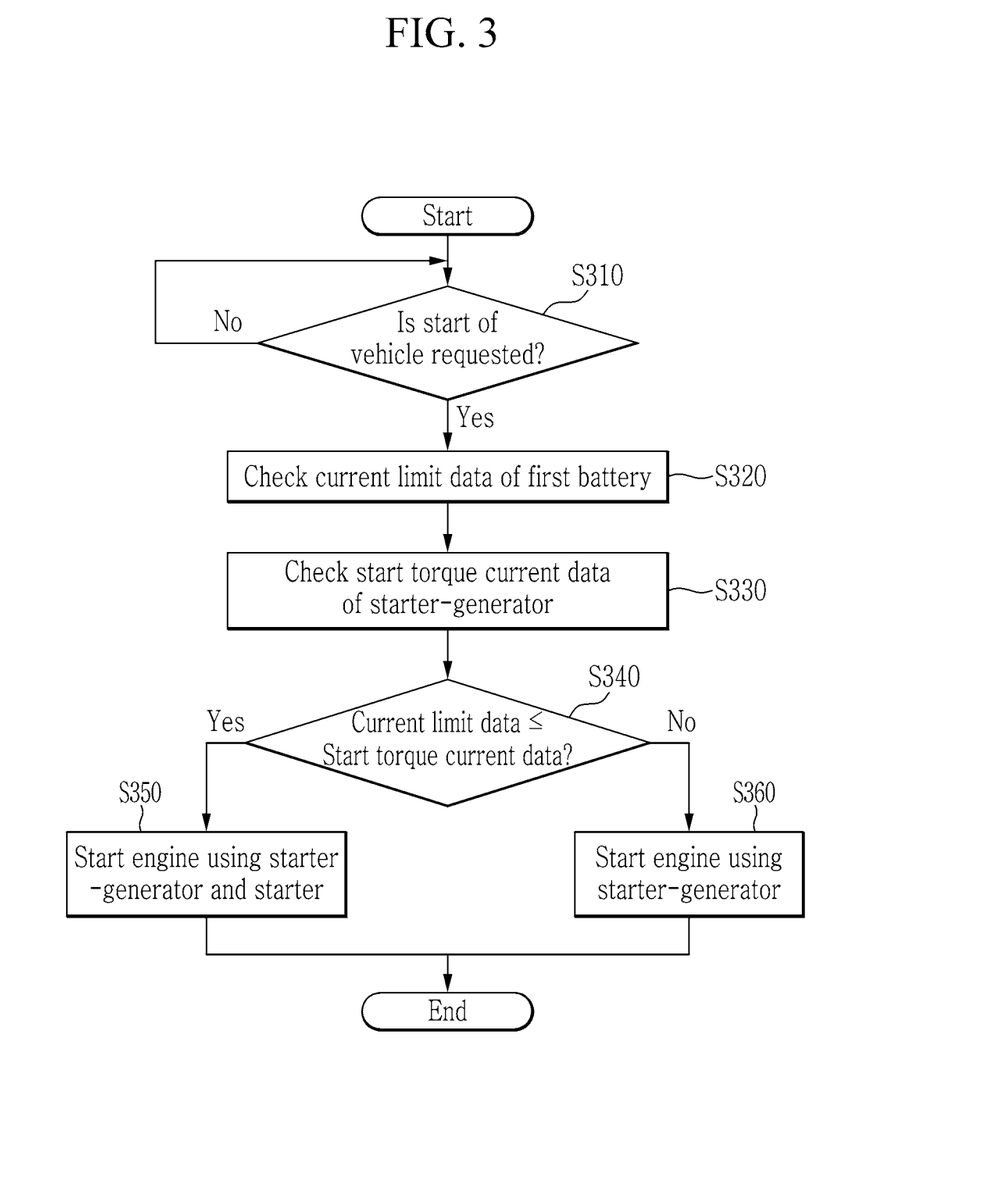
FIG. 3 is a flowchart showing the method for controlling a start of the mild hybrid vehicle according to the exemplary embodiment of the present invention.
Figure 4A:
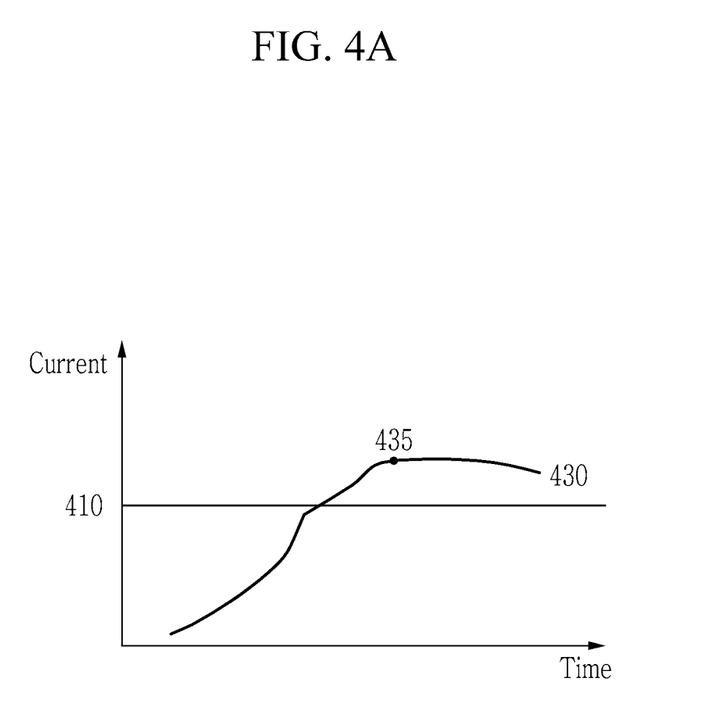
FIG. 4A, FIG. 4B, and FIG. 4C are graphs for explaining the method for controlling a start of the mild hybrid vehicle according to various exemplary embodiments of the present invention.

FIG. 3 is a flowchart showing the method for controlling a start of the mild hybrid vehicle according to the exemplary embodiment of the present invention. FIG. 4A, FIG. 4B, and FIG. 4C are graphs for explaining the method for controlling a start of the mild hybrid vehicle according to various exemplary embodiments of the present invention.

Referring to FIG. 3, the controller 250 may determine whether a start of the vehicle is requested in step S310.

The controller 250 may receive state data from the vehicle state detector 230 and may determine whether a start of the vehicle is requested based on the received state data. During initial starting, the controller 250 may determine whether a start of the vehicle is requested based on the start request signal.

When the vehicle is restarted, the controller 250 may determine that start of the vehicle is requested when the start request signal is received at the controller, the brake pedal position value included in the state data is less than or equal to a first reference value, or the accelerator pedal position value included in the state data is greater than or equal to a second reference value. The first reference value may be a value for determining whether a start of the vehicle is requested based on the brake pedal, and the second reference value may be a value for determining whether a start of the vehicle is requested based on the accelerator pedal.

In a case of restart of the vehicle, the controller 250 may determine that start of the vehicle is requested when a shifting stage of the shift lever is changed. For example, when the shifting stage is changed from a neutral (N) stage or a parking (P) stage to a driving (D) stage or a reverse (R) stage, the controller 250 may determine that start of the vehicle is requested.

When start of the vehicle is not requested, the controller 250 may monitor whether a start of the vehicle is requested.

When start of the vehicle is requested, the controller 250 may check the current limit data of the first battery 160 in step S320.

The battery state detector 210 may detect state data of the first battery 160 to provide the detected state data to the battery manager 220.

The battery manager 220 may receive the state data of the first battery 160 to check the received state data. The battery manager 220 may check the state data including at least one of a state of charge (SOC), a temperature, and a state of health (SOH) of the first battery 160, and a current value of each cell included in the first battery.

The battery manager 220 may check a degradation state of the first battery 160 based on the battery state data.

The battery manager 220 may check the current limit data based on the degradation state of the first battery 160. In more detail, the battery manager 220 may check a current table. The current table may be set by matching the current limit data to each of a plurality of degradation states of the battery. The battery manager 220 may check the current limit data corresponding to (or matching) the checked degradation state of the battery in the current table.

The battery manager 220 may provide the current limit data of the first battery 160 to the controller 250.

The controller 250 may receive the current limit data of the first battery 160 from the battery manager 220 to check the received current limit data.

In another exemplary embodiment of the present invention, the controller 250 may generate the current limit data. In another exemplary embodiment of the present invention, the controller 250 may include the battery manager 220.

The controller 250 may check the start torque current data of the MHSG 150 according to the state data of the vehicle in step S330.

In more detail, the controller 250 may receive the vehicle state data from the vehicle state detector 230. The controller 250 may check the start torque current data of the MHSG 150 according to at least one of the coolant temperature, the outside air temperature, and the RPM of the engine 110 included in the vehicle state data.

The controller 250 may determine whether the current limit data of the first battery 160 are less than or equal to the start torque current data of the MHSG 150 in step S340.

In more detail, the controller 250 may check a maximum current value of the start torque current data of the MHSG 150.

The controller 250 may determine whether the current limit data are less than or equal to the maximum current value of the start torque current data. For example, as shown in FIG. 4A, the controller 250 may check the maximum current value 435 of the start torque current data 430, and may determine whether the current limit data 410 are less than or equal to the maximum current value 435 of the start torque current data 430.

The controller 250 may start the engine 110 using the MHSG 150 and the starter 120 when the current limit data of the first battery 160 are less than or equal to the start torque current data in step S350.

When the current limit data are equal to or less than the maximum current value of the start torque current data, the controller 250 may start the engine 110 through the MHSG 150 until a reference time when the start torque current data becomes a reference current value. The reference current value may be set less than the current limit data. For example, as shown in FIG. 4B, the controller 250 may set the reference current value 450 which is less than the current limit data.

The controller 250 may start the engine 110 through the MHSG 150 from a start request time of the vehicle to the reference time. The start request time may indicate a time when a start of the vehicle is requested by the driver. For example, as shown in FIG. 4B, the controller 250 may start the engine 110 through the MHSG 150 from the start request time t2 to the reference time t1.

The MHSG 150 may start the engine 110 according to a control of the controller 250.

The controller 250 may start the engine 110 through the starter 120 from the reference time to a start completion time. The start completion time may be a time when revolutions per minute (RPM) of the engine 110 become a target RPM required for starting the engine.

Figure 4B:
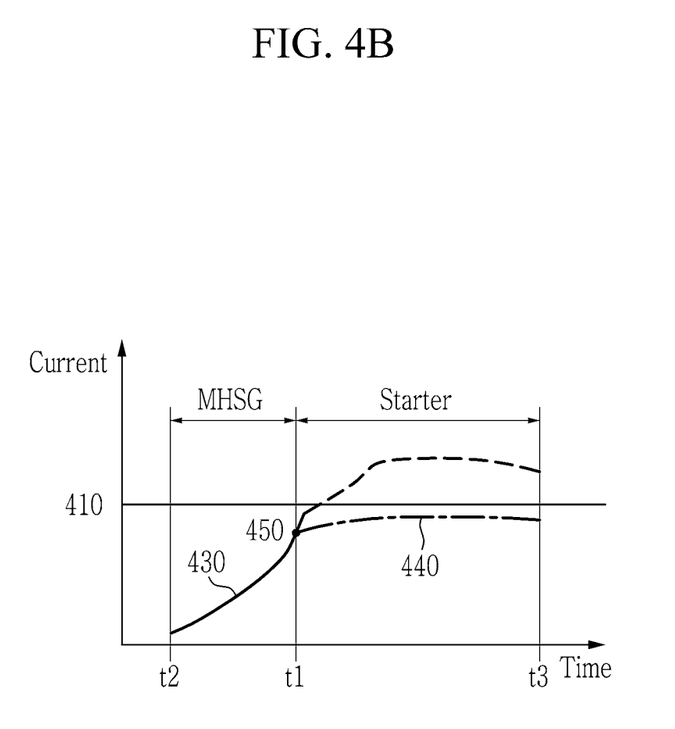

For example, as shown in FIG. 4B, the controller 250 may start the engine 110 through the starter 120 from the reference time t1 to the start completion time t3. Accordingly, the exemplary embodiment of the present invention may protect the first battery 160.

The starter 120 may start the engine 110 according to a control of the controller 250.

The controller 250 may start the engine 110 through the MHSG 150 when the current limit data of the first battery 160 exceed the start torque current data in step S360.

In more detail, the controller 250 may start the engine 110 through the MHSG 150 when the current limit data of the first battery 160 exceed the maximum current value of the start torque current data.

Figure 4C:
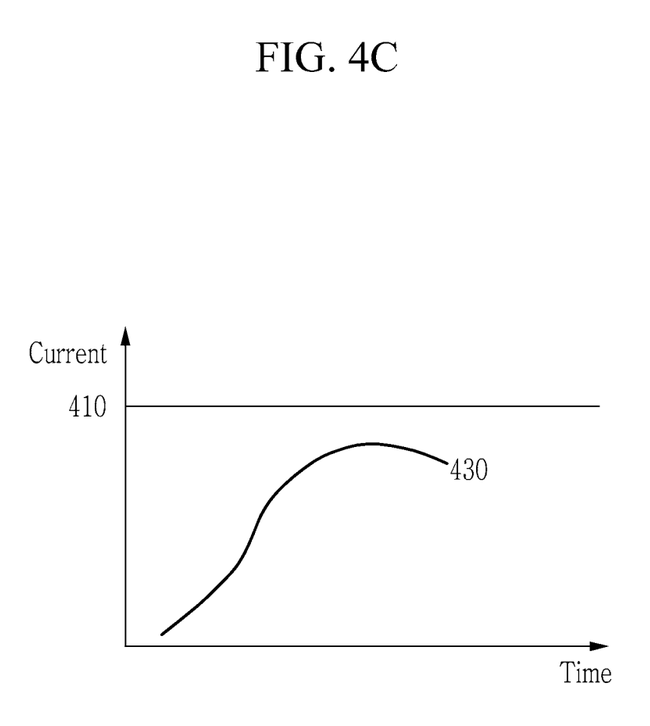

For example, as shown in FIG. 4C, the controller 250 may start through the MHSG 150 when the current limit data 410 exceed the maximum current value of the start torque current data 430.

The exemplary embodiment of the present invention may start the engine 110 using the MHSG 150 and the starter 120 when the vehicle starts according to the current limit value of the first battery 160 supplying electric power to the MHSG 150 so that startability of the engine is ensured and performance and durability of the first battery is improved.

Furthermore, the term "controller" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller may be at least one microprocessor operated by a predetermined program which may include a series of commands for carrying out a method in accordance with various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a start of a vehicle that includes an engine, a starter-generator starting the engine or generating electricity by an output of the engine, a starter starting the engine, and a battery supplying electric power to the starter-generator, the method comprising:
   determining, by a controller configured for controlling an operation of the vehicle, whether the start of the vehicle is requested;
   checking, by the controller, current limit data of the battery upon determining that the start of the vehicle is requested;
   checking, by the controller, start torque current data of the starter-generator according to state data of the vehicle;
   comparing, by the controller, the current limit data with the start torque current data; and
   starting, by the controller, the engine using the starter-generator or the starter according to a result of the comparing, by the controller, the current limit data with the start torque current data,
   wherein the comparing, by the controller, the current limit data with the start torque current data includes:
   checking, by the controller, a maximum current value of the start torque current data of the starter-generator; and
   determining, by the controller, whether the current limit data are less than or equal to the maximum current value of the start torque current data, and
   wherein the starting, by the controller, the engine using the starter-generator or the starter includes:
   starting, by the controller, the engine using the starter-generator until a reference time when the start torque current data becomes a reference current value when the current limit data are equal to or less than the maximum current value of the start torque current data; and
   starting, by the controller, the engine using the starter from the reference time to a start completion time.

2. The method of claim 1, wherein the determining, by the controller, whether the start of the vehicle is requested includes:
   determining, by the controller, that the start of the vehicle is requested upon determining that a start request signal is received, a position value of a brake pedal of the vehicle is less than or equal to a first reference value, a position value of an accelerator pedal of the vehicle is greater than or equal to a second reference value, or a shifting stage of a shift lever of the vehicle is changed.

3. The method of claim 1, wherein the checking, by the controller, the current limit data of the battery includes:
   checking, by the controller, the current limit data according to a degradation state of the battery.

4. The method of claim 1, wherein the checking, by the controller, the current limit data of the battery includes:
   checking, by the controller, a degradation state of the battery according to at least one of a state of charge (SOC), a temperature, and a state of health (SOH) of the battery, and a current value of each cell included in the battery;
   checking, by the controller, a current table matching the current limit data to each of a plurality of degradation states of the battery; and
   checking, by the controller, the current limit data corresponding to the checked degradation state of the battery in the current table.

5. The method of claim 1, wherein the checking, by the controller, the start torque current data of the starter-generator includes:
   checking, by the controller, the start torque current data of the starter-generator according to at least one of a temperature of a coolant of the engine, an outside air temperature of the vehicle, and revolutions per minute of the engine included in the state data of the vehicle.

6. The method of claim 1, wherein the starting, by the controller, the engine using the starter-generator or the starter includes:
   starting, by the controller, the engine using the starter-generator when the current limit data exceed the maximum current value of the start torque current data.

7. The method of claim 1, wherein the controller includes:
   a processor; and
   a non-transitory storage medium on which a program for performing the method of claim 1 is recorded and executed by the processor.

8. A non-transitory computer readable medium on which a program for performing the method of claim 1 is recorded.

9. A device configured for controlling a start of a vehicle, the device comprising:
   an engine configured to provide a driving force to the vehicle;
   a starter-generator configured to start the engine or generate electricity by an output of the engine;
   a first battery connected to the starter-generator and configured to supply electric power to the starter-generator or to be charged by electric power collected through the starter-generator;
   a starter engaged to the engine and configured to start the engine;
   a second battery connected to the starter and configured to supply electric power to the starter;
   a vehicle state detector configured to detect state data of the vehicle to control the start of the vehicle;
   a battery manager configured to check state data of the first battery and generate current limit data according to the state data of the first battery; and a controller connected to the battery manager and the vehicle state detector and configured to receive the current limit data of the first battery from the battery manager when the start of the vehicle is requested, check start torque current data of the starter-generator according to the state data of the vehicle, and start the engine using the starter-generator or the starter according to the current limit data and the start torque current data, wherein the controller is configured to check a maximum current value of the start torque current data of the starter-generator, start the engine using the starter-generator until a reference time when the start torque current data becomes a reference current value when the current limit data are equal to or less than the maximum current value of the start torque current data, and start the engine using the starter from the reference time to a start completion time.

10. The device of claim 9, wherein the battery manager is configured to check the state data of the first battery including at least one of a state of charge (SOC), a temperature, and a state of health (SOH) of the first battery, and a current value of each cell included in the first battery.

11. The device of claim 9, wherein the battery manager is configured to check a degradation state of the first battery according to the state data of the first battery and to check the current limit data according to the degradation state of the first battery.

12. The device of claim 9, wherein the controller is configured to determine that the start of the vehicle is requested when a start request signal is received, a position value of a brake pedal of the vehicle is less than or equal to a first reference value, a position value of an accelerator pedal of the vehicle is greater than or equal to a second reference value, or a shifting stage of a shift lever of the vehicle is changed.

13. The device of claim 9, wherein the controller is configured to check the start torque current data of the starter-generator according to at least one of a temperature of a coolant of the engine, an outside air temperature of the vehicle, and revolutions per minute of the engine included in the state data of the vehicle.

14. The device of claim 9, wherein the controller is configured to check a maximum current value of the start torque current data of the starter-generator and start the engine using the starter-generator when the current limit data exceed the maximum current value of the start torque current data.

15. The device of claim 9, wherein the controller is configured to set the reference current value which is less than the current limit data.

16. The device of claim 9, wherein the vehicle state detector includes:
  a start detector configured to detect the start of the vehicle;
  a brake pedal position detector configured to detect a position value of a brake pedal of the vehicle;
  an accelerator pedal position detector configured to detect a position value of an accelerator pedal of the vehicle;
  a shifting stage detector configured to detect a shifting stage of a shift lever of the vehicle;
  a coolant temperature detector configured to detect a temperature of a coolant of the engine;
  an outside air temperature detector configured to detect an outside air temperature of the vehicle; and
  revolutions per minute (RPM) detector configured to detect revolutions per minute (RPM) of the engine.

* * * * *